July 12, 1932.    B. CHRISTMAS    1,867,138
ELECTRIC LIGHT AND HEADLIGHT
Filed Sept. 12, 1930    2 Sheets-Sheet 1

INVENTOR
Burton Christmas
BY
Edward Thomas
his ATTORNEY

July 12, 1932.  B. CHRISTMAS  1,867,138
ELECTRIC LIGHT AND HEADLIGHT
Filed Sept. 12, 1930   2 Sheets-Sheet 2
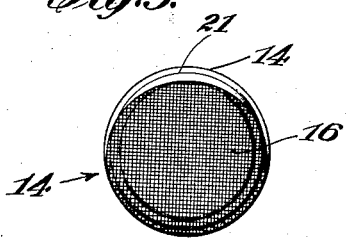
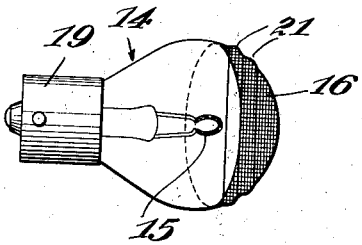
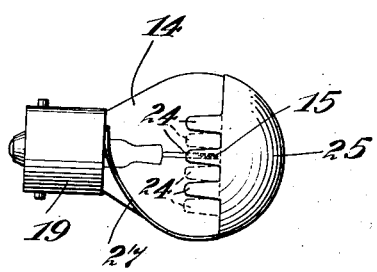
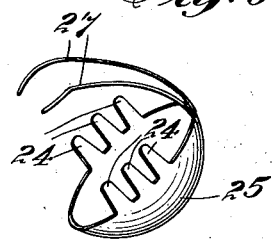
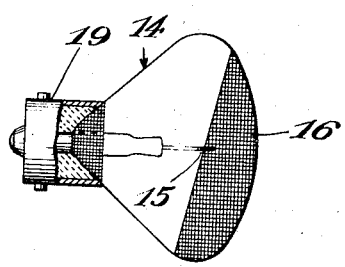
INVENTOR
Burton Christmas
BY
Edward Thomas
his ATTORNEY Patented July 12, 1932

1,867,138

UNITED STATES PATENT OFFICE

BURTON CHRISTMAS, OF SAUGERTIES, NEW YORK

ELECTRIC LIGHT AND HEADLIGHT

Application filed September 12, 1930. Serial No. 481,475.

This invention relates to electric lights and head-lights and is herein illustrated as including an incandecent bulb for use in many kinds of standard automobile headlights. Such headlights are usually regarded as obliged to conform to contradictory requirements,—one requirement being that they throw a bright light along way ahead; the other requirement being that the glare from the lights shall not blind the eyes of an approaching driver or traveller.

For this reason it has been customary to provide automobiles with two sets of lights, one bright for throwing light a long way ahead, the other dim enough to send out a little light, usually too faint either to blind an approaching traveller or to effectively light the road. Other automobiles have been provided with lamps having two sets of filaments, one in focus, the other out of focus.

Both of these systems of lighting require the drive of the automobile, provided with the lights, to bear in mind the necessity for frequently and suddenly shutting off the bright lights, and then require him to turn on the bright lights if he is desirous of seeing clearly far ahead. Besides this inconvenience, the vision of the automobile driver is diverted and handicapped by the changes of light intensely in his field of vision.

According to the present invention these and other difficulties and disadvantages are overcome, by providing a light shield which may be in the form of a reflector or mirror, preferably a mirror formed by silvering part of the lighting bulb, thus insuring that the shield or mirror is not displaced by vibration or jolts. This shield or mirror is herein illustrated as so shaped as to prevent an approaching traveller from seeing the filament itself. The shield is further shown as so shaped at the bottom as to intervene between the lamp filament and a substantial area of the front bottom sector of the usual parabolic reflector with the result that the approaching traveller sees a dark half or quarter moon at that bottom sector, thus escaping the light which would otherwise be reflected slightly upward and would tend to blind him.

The shield or mirror distributes light much more effectively if it or the bulb is provided with corrugations which spread or slightly dissipate the light. By forming the shield or mirror as a silvered coating on a corrugated bulb the best results are easily obtained. The invention has been found to so distribute the light as to be of especial use to drivers on foggy nights for it seems to diminish the return glare of the fog.

Other features and advantages are hereinafter described.

In the accompanying drawings:

Fig. 3 is a front end view of a bulb;

Fig. 4 is a top view of the same;

Fig. 5 is a view of a modification in which the mirror is on a removable cap;

Fig. 6 is a view of the cap;

Fig. 7 is a view of a modified form of bulb.

Figure 1:
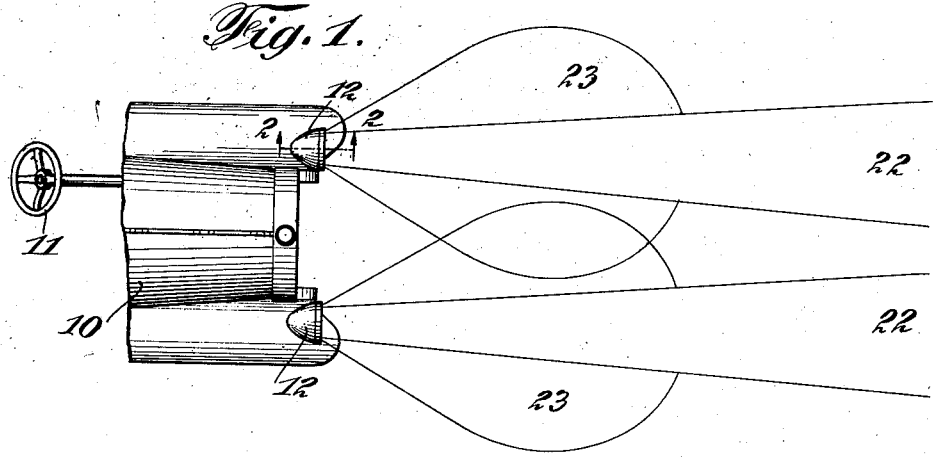
Fig. 1 is a top view of an automobile fitted with the new lights.
Figure 2:
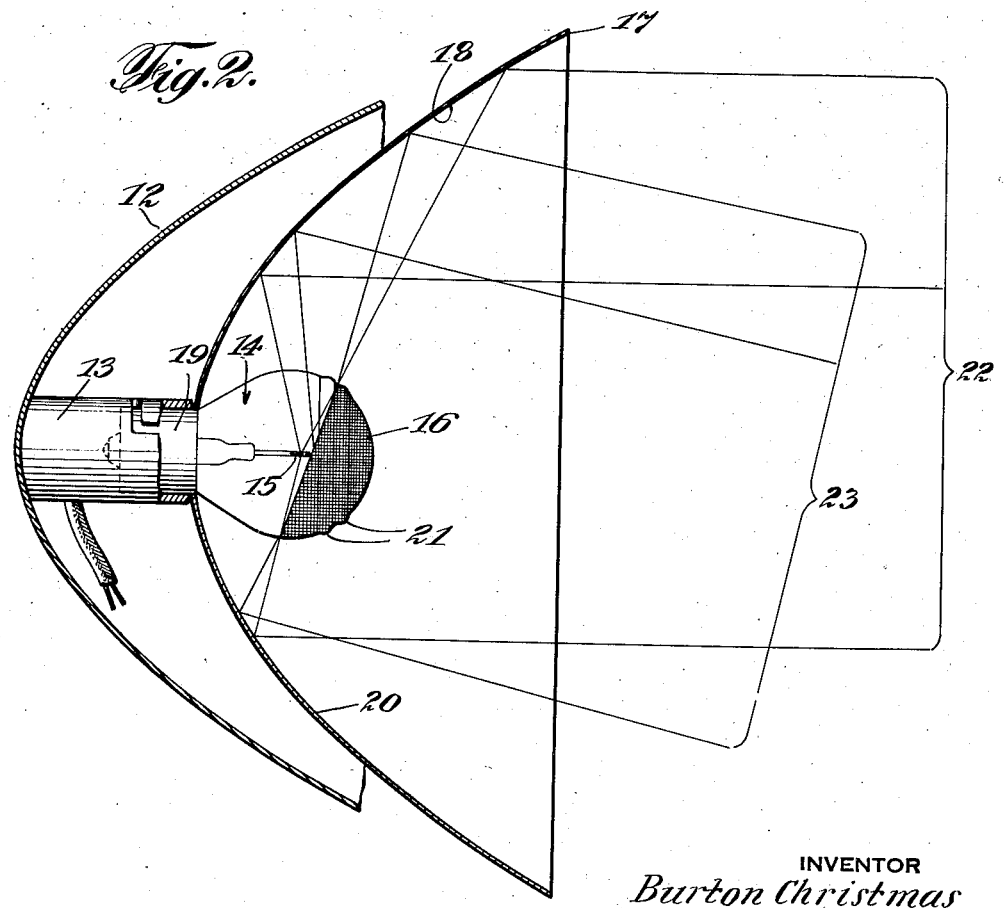
Fig. 2 is a full-sized section through a headlight on the line 2—2 of Fig. 1.

An automobile 10, having a steering wheel 11, is shown having the usual parabolic headlights 12. In these headlights are mounted at the usual focusing sockets 13 clear incandescents bulbs 14, having the usual single filaments 15. The bulbs illustrated are slightly more pear-shaped than spherical. Each bulb is shown as provided with an outside silver shield coating 16, protected by a suitable protective covering, as a dipped lacquer coat covering the silvered area. The bulb at the inside of the base is preferably silvered, care being taken not to short circuit the leading-in wires. This base silvering materially increases the illuminating effect of the lamp. The best results have been obtained with the bulb illustrated in Fig. 7, in which the bulb is shaped like a flattened top, and is silvered inside the base. In this bulb, even to a greater degree than other bulbs, the filament is nearer the curve of the bulb than its center of curvature.

The coating 16 is off-center, with its upper edge so lying on the glass that the mirror or shield 16 just cuts off all light rays that would escape the upper edge 17 of the parabolic mirror, but allows substantially the whole of the light from the filament to reach the upper parabolic surface 18.

The lower edge of the mirror 16 is in effect an extension slightly nearer to the base 19 of the bulb 14 than the lowest point of the bulb or to the point of lowest curvature, so that the mirror 16 cuts off the major part of the direct light rays from the filament to the lower part 20 of the parabolic mirror, except from something more than an inch of the parabolic mirror near the bulb base 19, thus forming the dark half or quarter moon sector.

The bulb may be silvered by dipping so that the edge of the silvering falls as described above, and when so silvered the boundary of the mirror 16 which lies in a plane is found to give a satisfactory illumination to the road in front of the automobile.

Preferably the bulb or mirror is of the corrugated type, the bulb having, for example, two complete corrugations as shown at 21, and, when such a bulb is used, the illumination of the road in front of the automobile will be approximately as shown in Fig. 1. Here the road straight ahead is brightly lighted as at 22, and, near the headlights, the road is adequately, but diffused or less brilliantly lighted in a fan, as shown at 23. Satisfactory results are obtained with a so-called "tilt bulb". If the bulb has no undulations or corrugations the mirror may be provided with a fringe of projections 24, as illustrated in Fig. 6. In this case the projections on one side of the cap 25 are staggered with those on the opposite side. Thus a metal cap 25 silvered inside, and provided with a wire clip 27 to catch on the bulb and hold it there, may be used instead of the mirror silvered on the bulb.

Having thus described one embodiment of my invention, what I claim is:

1. A headlight including a parabolic mirror, a lamp having a base and a filament adapted to throw a beam of light reflected from the mirror, a reflecting shield adapted to shut off all rays of light from the filament except those that strike the mirror, and an extension of the shield at the bottom terminating in a vertical plane back of but adjacent to the focal plane of the parabolic mirror.

2. A headlight including a parabolic mirror, a lamp having a base and a filament adapted to throw a beam of light reflected from the mirror, a reflecting shield adapted to shut off and reflect to the mirror all rays of light from the filament except those that strike the mirror directly, an extension of the reflecting shield at the bottom toward the base of the lamp adapted to shut off and reflect to the mirror rays of light starting toward the lower part of the parabolic mirror which would be reflected upwardly, and means on the shield in the form of corrugations for diffusing part of the light to spread a fan of light near the mirror.

3. A bulb having a light source and a reflecting shield covering the entire front and terminating along a plane diagonal to the axis of the bulb and passing closely adjacent the forward edge of the light source.

4. A bulb having a light source and a corrugated end and a reflecting shield metal-plated on the bulb covering the entire front and terminating along a plane diagonal to the axis of the bulb and passing closely adjacent the forward edge of the light source.

BURTON CHRISTMAS.